United States Patent [19]

Mosely

[11] 4,306,781
[45] Dec. 22, 1981

[54] MULTI-CHANNEL SOUND AND DATA SYSTEM

[76] Inventor: John Mosely, P.O. Box 38795, Hollywood, Calif. 90038

[21] Appl. No.: 113,822

[22] Filed: Jan. 21, 1980

[51] Int. Cl.³ ............................................. G03B 31/00
[52] U.S. Cl. ...................................... 352/37; 352/11; 352/239
[58] Field of Search ............................ 352/11, 37, 239

[56] References Cited

U.S. PATENT DOCUMENTS

| | | | |
|---|---|---|---|
| 2,298,618 | 10/1942 | Garity et al. | 352/11 |
| 2,590,956 | 4/1952 | Gille | 352/37 |
| 3,471,223 | 10/1969 | Langone | 352/83 |

FOREIGN PATENT DOCUMENTS

| | | | |
|---|---|---|---|
| 319761 | 9/1930 | United Kingdom | 352/11 |
| 342284 | 2/1931 | United Kingdom | 352/11 |

Primary Examiner—Monroe H. Hayes

[57] ABSTRACT

A multi-purpose sound/data system which is capable of recording and reproducing a multitude of disparate and dissimilar information being digital and/or analog in nature in such a way so that there is no interference between the different information channels. This system is principally intended to be applied to motion picture film, but it is equally applicable to television and other devices by which sound, data and pictures may be electrically, mechanically or optically recorded and reproduced. It is an important feature that a film recorded with this system can be reproduced by any standard photographic soundhead without alteration, in the same way as a normal photographic soundtrack. This invention confines itself to the layout of the tracks to present a compatible format and does not deal with the methods of recording and reproduction.

6 Claims, 3 Drawing Figures

MULTI-CHANNEL SOUND AND DATA SYSTEM

BACKGROUND OF THE INVENTION

This invention relates to sound systems and in particular to a new and improved compatible mono/stereo photographic sound system with data control, especially suited for use in motion picture theaters.

Stereophonic sound systems have been known for many years. British patent to Blumlein, No. 394,325 discloses most of the significant features and 2 channel systems have been used extensively since about 1958. A multi-channel sound system was used in the motion picture Fantasia. (U.S. Pat. No. 2,298,618) This system was extremely complex and expensive and has not been used since the 1939 production. In 1953, CinemaScope was introduced with four magnetic tracks striped on the motion picture film, with three of the sound channels positioned behind the screen at the left, center and right, with the fourth channel sometimes refered to as a surround track. This fourth channel fed a plurality of speakers positioned at the sides and back of the theater with all speakers connected together. The fourth track was switched on to produce a dramatic effect when desired. A later variation known as "Todd-AO" utilized 6 magnetic tracks on the film, with 5' speakers behind the screen and the sixth track used to drive the speakers at the sides and back of the theater. None of these configurations have been particularly satisfactory because of their added cost and technical difficulties both in making the special prints and maintaining the complex theater systems, compared to the standard photographic single channel soundtrack.

In order to maximize the use of 35 mm prints, magnetically striped and recorded for 4 channel stereophonic sound, the monophonic photographic sound track has been added, thereby making a compatible print. But as aforesaid, this process is seldom used because of its cost and technical difficulties. In recent years there has been a renewed interest in multi-channel stereophonic sound for motion pictures and television. Since the photographic soundtrack is applied and processed simultaneously with the picture, there are obvious advantages to be had by confining film sound to this format. Throughout the history of sound on film covering the last 50 years, many photographic formats have been used, covering the sound itself and means of controlling it. Both single ended and push-pull systems have been used. Since about 1938, all films released for normal threatrical exhibition have had their soundtrack made to conform to the "Academy Curve". This was fully described by the Motion Picture Research Council in their publication entitled, "Standard Electrical Characteristics for Theater Sound Systems", dated April 20th, 1948. This curve was derived empirically to give the best compromise between signal to noise ratio, dynamic range and frequency response. It is shown as FIG. 1 hereof. It will be appreciated that this curve is a far cry from the modern ideal of a wide range Hi-Fi system. Furthermore, in order to obtan satisfactory sound in the theaters, the recordings are made with considerable upper mid-range and high frequency pre-emphasis.

Despite numerous attempts to circumvent the Academy Curve, no commercial system exists. It must be understood that of the 85,000 theaters situated in the western world, less than 10% are able to reproduce anything other than the Academy Curve. A key part of this invention is the inclusion of an Academy track situated in such a way that whenever a film recorded in accordance with this invention is placed upon a standard Academy reproducer, it will be virtually indistinguishable from the same material recorded with a standard optical recorder. Simultaneously the soundtrack described in this invention contains a minimum of four additional soundtracks for stereophonic sound plus extra tracks for data, automatic switching and guidance. By using a suitable data system such as the SMPTE time code, useful information and commands can be stored on a per frame basis.

SUMMARY OF THE INVENTION

Figure 1:
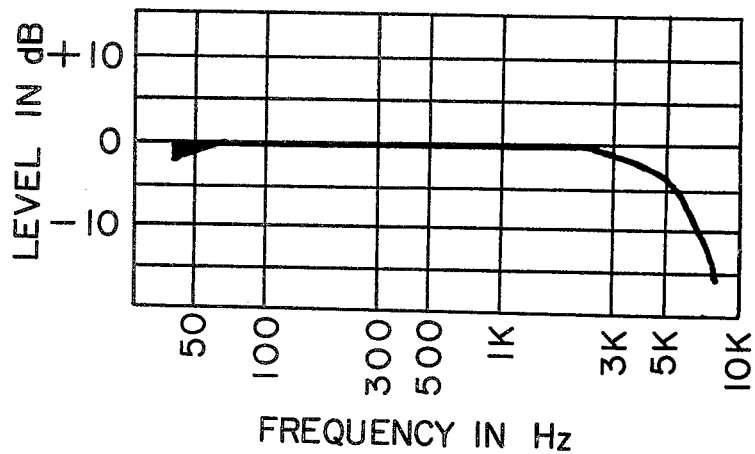
FIG. 1 shows the characteristics of an electrical network conforming to the "Academy Curve". It is placed in the monitoring circuit of a re-recording console during the dubbing process. The soundtrack will be subjectively equalized so as to sound satisfactory through this filter. When the monophonic soundtrack is reproduced in the theater, it will sound similar to the sound heard in the dubbing room and therefore correct.
Figure 2:
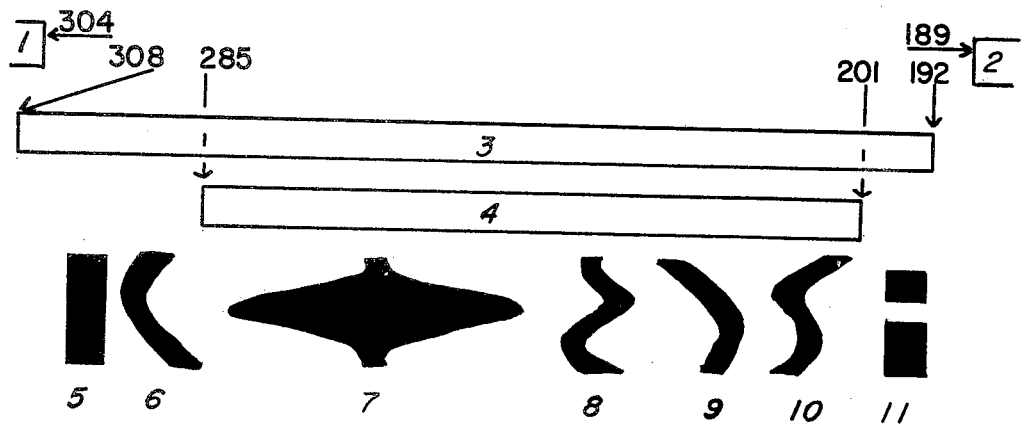
FIG. 2 shows the prefered geometric layout of this invention when used in the 35 mm format, superimposed upon the presently existing standards for sound tracks. The layout conforms to and uses dimensions from American National Standards PH 22.111 which dictates the printer data and PH 22.40 which dictates the soundtrack scan area. The numbers shown in the upper part of the figure of 189, 192, 201, 285, 304 & 308 are the number of milli-inches from the reference edge of the film. The italisized numbers which also apply to FIG. 3 have the following meaning: 1 is the edge of the printed picture; 2 is the perforation edge nearest the reference edge of the film; 3 is the area exposed by the soundtrack printer; 4 is the area scanned by the monophonic projection apparatus; 5 is the locator track; 6 is the surround track; 7 is the monophonic track; 8 is the right track; 9 is the center track; 10 is the left track; 11 is the command data track and 12 is the reference edge of the film.
Figure 3:
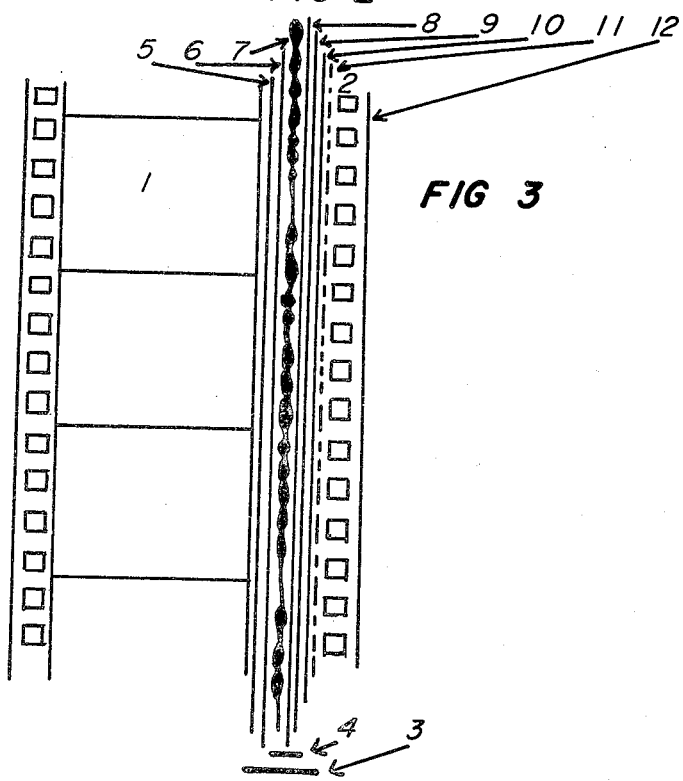
FIG. 3 shows a 35 mm film with the tracks and picture in their correct proportion.

The multi-purpose sound/data system of the present invention is the prefered embodiment incorporates an "Academy" monophonic variable area recording, a minimum of 3 constant width wide range stereophonic recordings to be reproduced as left, center and right channels within the ANSI scan area as shown in FIG. 2. Further tracks outside the ANSI scan area are included for the surround channels as well as a data track and an additional locator track to aid in the guidance and scaling of the system when it is read by a stereophonic reproducer. It is a feature of this invention that all the tracks fall within the area assigned for soundtrack printing in ANSI PH 22.111 shown in FIG. 2, together with its ISO counterpart. Furthermore, an important feature of this invention is its compatability with all existing photographic reproducers so that when a recording is reproduced, it will be virtually indistinguishable from a normally recorded monophonic Academy track. No data will be heard and there will be no discernable cross-talk from the stereophonic channels on a reproducer conforming to the established standards and recommended practice. This is because a normal photo-optical system recognizes changes in light level to produce an electrical output. Therefore no modulated output will be derived from lines of constant width.

This invention distinguishes itself from other systems that have proposed a similar combination track using modulated locator channels placed at the extremities of the projector scan. The use of such tracks are not practical since they produce cross-talk into an Academy reproducer and their data handling capacity is significantly inferior to the prefered embodiment of this invention.

FIG. 2 shows the prefered track layout for this recording system for 35 mm film and the relationship of the standards for reproducing and printing of photographic sound tracks. By placing the Academy track as shown, not only will it be properly reproducible under the described conditions, but the print may be magnetically striped in accordance with ANSI PH 22.177 (not shown). The remaining half of the normal projector scan will view the left, center and right stereophonic tracks in the prefered embodiment.

By placing the surround track outside the normal projector scan, it can be recorded with a compound signal like a stereophonic phonograph record groove, thereby embodying 2 or more separate channels of information. The MS technique is described in British Pat. No. 394,325 and a 4-2-4 channel system is described in U.S. Pat. No. 3,787,622. When properly recorded, the surround track can be reproduced compatibly as 1, 2 or 4 channels of sound, depending upon the sophistication of the reproducer. A compound signal cannot be placed inside the normal projector scan since it would contribute unacceptable cross-talk into the Academy reproducer when the film is played monophonically. If prefered, a multiplicity of separate tracks can be used to accomplish this end.

The prefered data command track of this invention is the SMPTE time code, which is extensively used in the television field. Since each frame of picture is uniquely identified, it offers an easy method of timing, editing and assembling programs.

The application of this system to motion picture photography can result in similar advantages since the "Manchester Codes" (as embodied by SMPTE) have considerable unused spaces which can be user assigned. These spaces are of enormus potential value for control of the projection equipment, theater lights, curtains and special effects from the recording. Also multilingual captioning data can be recorded into the same spaces. These data can be presented with an alpha numeric device or preferably pin diode or similar arrays of suitable dimensions through an appropriate decoder under the screen. Pin diode arrays permit any language or diagram to be embodied into the data, thereby making a single recording usable world-wide.

It is a desirable feature of this invention to incorporate an additional reference track within the recording so that the stereophonic reader will be able to recognize the track format and provide both proper scaling and electronic guidance of the reproducer. U.S. Pat. No. 4,124,784 describes such a reproducer. Since a normal photographic soundtrack reproducer is a relatively crude mechanical device, producing mechanical jump or weave, special guidance is mandatory in order to ensure lack of cross-talk and distortion, due to mistracking. Although the placement of this locator track is relatively unimportant provided it is unmodulated, it is ideally placed at the opposite extremity to the command track in order to provide the maximum mechanical advantage or fulchrum. If however it is modulated, it must be placed outside the ANSI scan specified in PH 22.40.

Whilst the prefered embodiment contemplates a 7 track photographic recording with a motion picture film, it is readily appreciated that more sound sources and channels can be utilized and that other recording and reproducing media can be used. FIG. 2 shows how this system can be incorporated into 35 mm film, but it can easily be applied to other gauges embodying more or less channels whilst retaining compatibility and the other advantages of this invention.

The system of the present invention is compatible with presently available equipment including microphones and loudspeakers, matrix encoders and decoders, and film recording reproducing and projection equipment. A specially designed multitrack recorder is the prefered means of laying down the multiple tracks. For example, a cathode ray tube is an excellent modulator. Also, standard faders, noise reduction systems, amplifiers, mixers, limiters, compressors, panpots and other signal modifying means may be utilized as required. When desired, the system of the present invention can be installed in conjunction with existing sound systems with appropriate switches for selecting one system or the other depending upon the theater operators' desires.

I claim:

1. A motion picture film having a photographic sound track for selective reproduction of monophonic sound when used with conventional photographic sound projection apparatus or for reproduction of multi-channel stereophonic sound when used with appropriate stereophonic sound projection apparatus, said sound track comprising:
    (a) one or more variable area or variable density monophonic recording tracks for reproduction through a conventional optical reproducer, said monophonic recording tracks occupying approximately half of the area reproduced by conventional sound projection apparatus;
    (b) two or more constant width tracks for stereophonic recordings, said stereophonic recording tracks occupying approximately half of the area read by conventional sound projection apparatus, but not reproduced by it other than as crosstalk;
    (c) one or more additional tracks for stereophonic recordings, adjacent to but outside the area read by conventional sound projection apparatus;
    (d) one or more command data tracks adjacent to but outside the area read by conventional sound projection apparatus; and
    (e) one or more unmodulated locator tracks at or near the extremities of the multiplicity of tracks, adjacent to or outside the area read by conventional sound projection apparatus.

2. A 35 mm motion picture film as described in claim 1 comprising:
    (a) one or more variable area or variable density monophonic recording tracks for reproduction through a conventional optical reproducer, said monophonic recording tracks lying between 244 and 285 milli-inches from the reference edge of the film;
    (b) three constant width tracks for left, center and right stereophonic recordings lying between 201 and 244 milli-inches from the reference edge of the film;

(c) a fourth track for stereophonic recording lying at least 286 milli-inches from the reference edge of the film;

(d) a command data track placed in an area extending from the film perforations to a distance of not more than 200 milli-inches from the reference edge of the film; and (e) an unmodulated locator track at or near the opposite extremity of the multiple tracks from the reference edge of the film and at least 286 milli-inches from the reference edge of the film.

3. A motion picture film as described in claim 1 which incorporates one or more command data tracks but not a locator track.

4. A motion picture film as described in claim 1 which incorporates one or more locator tracks but not a command data track.

5. A motion picture film as described in claim 1 which combines a visual image bearing a synchronous relationship to each other.

6. A motion picture film as described in claim 1 being less than 35 mm in width which contains less tracks.

* * * * *